United States Patent
Kennard (10) Patent No.: US 6,820,849 B2
(45) Date of Patent: Nov. 23, 2004

(54) MULTI-FUNCTION CLAMP

(76) Inventor: Christopher Kennard, 3727 Willowcrest Ave., Studio City, CA (US) 91604

( * ) Notice: Subject to any disclaimer, the term of this patent is extended or adjusted under 35 U.S.C. 154(b) by 0 days.

(21) Appl. No.: 10/318,775

(22) Filed: Dec. 12, 2002

(65) Prior Publication Data

US 2003/0110604 A1 Jun. 19, 2003

Related U.S. Application Data

(60) Provisional application No. 60/340,441, filed on Dec. 13, 2001.

(51) Int. Cl.[7] .............................. A47B 96/06
(52) U.S. Cl. ................................ 248/231.61
(58) Field of Search ............... 248/231.61, 231.41, 248/229.12, 229.14, 229.22, 229.24, 228.3, 228.5, 230.3, 230.5, 229.2, 229.25, 228.6, 230.6, 231.71

(56) References Cited

U.S. PATENT DOCUMENTS 4,131,257 A * 12/1978 Sterling ...................... 248/67.5
5,027,472 A * 7/1991 Goodman ...................... 16/422
5,131,780 A * 7/1992 Love ........................... 403/290
5,276,949 A    1/1994 Cordellini
5,326,059 A * 7/1994 Pryor et al. ............. 248/231.71
5,586,373 A * 12/1996 Eby et al. ....................... 24/525
6,067,693 A * 5/2000 Chen ............................. 24/514
6,494,642 B1 * 12/2002 Daly ............................. 405/36

* cited by examiner

Primary Examiner—Leslie A. Braun
Assistant Examiner—A. Joseph Wujciak
(74) Attorney, Agent, or Firm—J. D. Harriman, II; Coudert Brothers LLP (57) ABSTRACT

A clamp device designed for use in the motion picture industry where there is a need for temporarily mounting and supporting various lighting and other hardware on or from available surfaces and fixtures without marring them. The clamp device basically includes a fixed jaw attached to one end of a threaded shaft and an adjustable jaw which is movably mounted on the threaded shaft. A threaded adjustment member is coupled to the adjustable jaw to control the position of the jaw along the threaded shaft. Both jaws are configured to accommodate a multiplicity of variously shaped surfaces and structural members on which they are designed to be mounted.

23 Claims, 6 Drawing Sheets

FIG. 13

MULTI-FUNCTION CLAMP

RELATED APPLICATION

This application claims priority from Provisional Application No. 60/340,441, filed Dec. 13, 2001.

BACKGROUND OF THE INVENTION

The present invention generally relates to clamping devices and, more particularly, to such devices which are specifically designed for use in the movie industry as supports for lighting and rigging equipment.

One particular clamping mount of the type disclosed herein is the subject of U.S. Pat. No. 5,276,949, issued Jan. 11, 1994 to Steven L. Cordellini. The Cordellini clamp has become more or less standard in the motion picture lighting industry. Broadly considered, it comprises a pair of jaws and a partially threaded shaft. One of the jaws is fixed in position midway along the shaft adjacent the threaded portion. The other jaw is slidable along the threaded portion and is driven toward the fixed jaw to clamp the device on a support of some sort by a knob which has internal threads that made with the threaded portion of the shaft.

To mount a light or piece of rigging hardware on the clamp device, it is affixed to the end of the shaft remote from the threaded portion. This end is shaped with a standard configuration for insertion into mounting receptacles that are standard on whatever items of equipment are to be mounted on the clamp device. Thus, when the knob is turned to tighten the two jaws of the device to grip a support member, the piece of lighting or rigging equipment which is attached to the unthreaded end of the shaft is supported as desired.

While closing the jaws by rotating the knob serves to clamp the device in position, rotating the knob in the opposition direction does not always result in the device unclamping itself. Due to slight distortion of the slidable jaw resulting from the force used to clamp the jaws on a support element, the slidable jaw often remains locked in position when the knob is loosened. This is a common occurrence and it generally requires a tap from a hammer or the like to release the slidable jaw to an unclamped position.

A number of items in the catalog of Matthews Studio Equipment, Inc. are listed and described in the introduction of the Cordellini patent. The reader is referred to the Matthews catalog and to the Cordellini patent for a description of the various items A through R from the catalog. Cordellini points out numerous deficiencies of the various items A through R and asserts the benefits of the Cordellini clamp over all of the prior art devices. The clamping device of the present invention is a significant advance in the art over the Cordellini clamp and it is expected to supersede the Cordellini clamp because of its numerous benefits, improvements and advantages with respect thereto.

SUMMARY OF THE INVENTION

In brief, arrangements in accordance with the present invention comprise a pair of particularly configured jaws mounted on a threaded shaft with an internally threaded knob for adjusting the spacing between the jaws, both in closing the jaws to establish the clamping function about some support member, such as a pole, and in driving them apart to actively release the clamp. In addition, the invention can be used as a "wall spreader" by propelling the jaws apart in order to establish a mounting on a pair of opposed parallel surfaces, such as the sides of a door frame.

The threaded shaft is threaded throughout its length with a No. 8 ACME thread. Thus, for economy of fabrication, it can simply be cut from longer threaded rod stock and does not require the special threading operation which is necessary in fabricating the device disclosed in Cordellini. The free end of the shaft has an internally threaded bore for receiving a threaded mounting pin to establish the configuration shown in the patent where the end of the shaft is formed in the configuration of a mounting pin. In addition, each of the jaws is provided with a plurality of threaded holes to receive a threaded mounting pin at different points on the jaws and at different angles.

For ease of fabrication, the two jaws are formed in identical fashion to provide a variety of different surfaces which are particularly adapted to clamp onto support members of different shapes and sizes, for example, round poles or pipes, square or rectangular supports, large or small circular members and the like. The jaws are formed with clamping surfaces of different types, capable of clamping onto a wide variety of surfaces, at opposite ends of the jaws. Moreover, each of the jaws has its opposite faces shaped in complementary fashion to provide a V-shaped clamp groove in each face for permitting the jaws to clamp in either direction. The limits of the mounting surfaces (V-grooves and the like) on opposite faces of a given jaw device terminate at a plane for that face of the jaw, thereby serving to stabilize the clamp when it is mounted on any support member. In addition, each end of the jaw is provided with an opening of a size and shape to accommodate a carabiner for attaching a line, such as a cable, cord, rope or the like. If no carabiner is available, these opening accommodate the rope itself which may be passed through the opening and secured.

The fixed jaw is provided with a circular recess extending about the threaded shaft. This is to accommodate a projecting titanium sleeve which is installed in the adjustable jaw, thus permitting the two jaws to be closed together if desired without interference by the protruding sleeve. This titanium sleeve protects the material of the aluminum jaw from wear or binding against the threads of the shaft.

The adjustable jaw is provided with a U-shaped slot extending inwardly from one side of the jaw adjacent the titanium sleeve to receive a partially threaded brass sleeve during assembly of the adjustable jaw on the shaft. A ¾ inch deep knob with an ergonomically designed three-bladed handle and a hexagonal one-inch nut, directly below the handle, all constituting one piece, is fixedly mounted at one end of the brass sleeve. The hexagonal nut is provided with six flats to accommodate a wrench which may be used to apply more torque than could be developed by manually turning the knob. At the end of the brass sleeve remote from the knob is a head portion extending radially outward from and surrounding the sleeve. A washer is affixed to the face of the head portion which is nearer the hexagonal nut and is immovable by design.

In assembling the adjustable jaw and the brass sleeve and knob on the threaded shaft, the head portion is slid laterally into the U-shaped slot of the jaw, together with another washer on the side opposite the first-mentioned washer, and the assembly is then threaded onto the threaded shaft.

The pins which are provided with the clamps of the present invention are of ⅝ inch diameter, which is standard in the industry. However, each pin is provided with two flats at its distal end for engagement by a wrench. The pins are of two different lengths, each having a threaded end ⅜ inch in diameter. The threaded end is out from ⅜ inch rod, No. 16 thread, which is mounted in a threaded bore in the end of the pin and held with a stainless steel roll pin.

A non-skid material is applied on all jaw faces. This can be developed by using a boat deck coating which is available from marine supply stores. This material serves to keep the metal, of the jaws from scratching items to which the clamp may be attached.

Other features and advantages of the invention will become more apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figures 1, 2:
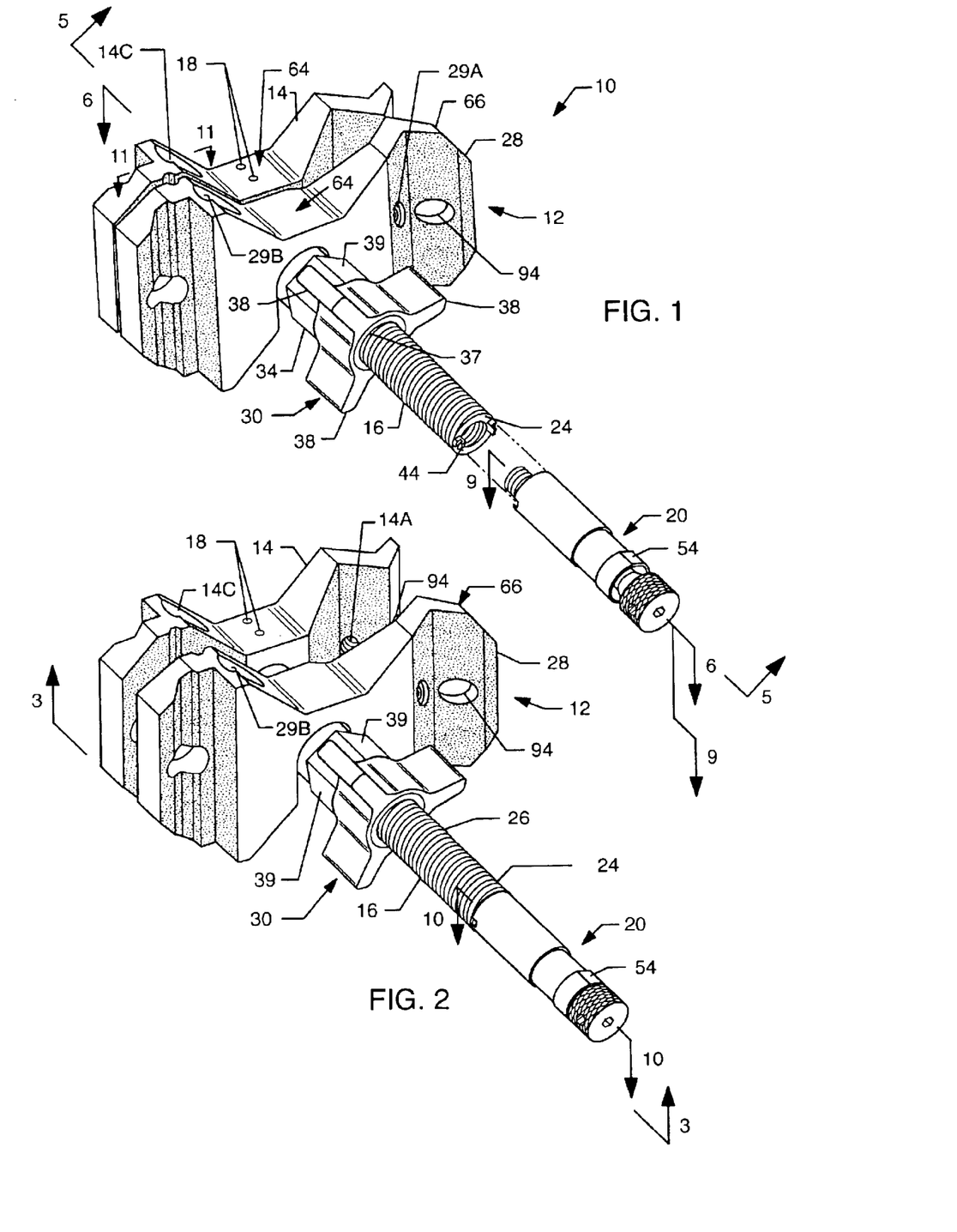
FIG. 1 is an exploded orthogonal view, showing a clamp assembly in accordance with an embodiment of the invention with closed jaws.
FIG. 2 is an orthogonal view of the adjustable jaw of the arrangement of FIG. 1 shown with jaws open.

Structural details of the preferred embodiment of the clamping device of the invention are shown in FIGS. 1–5. FIG. 1 represents the complete clamping apparatus 10 principally comprising an adjustable jaw assembly 12, a fixed jaw 14, and a threaded shaft 16. The shaft 16 is threaded throughout its length and is preferably, for reasons of economy and ease of fabrication, cut to the desired length from a rod of threaded stock. As shown in FIG. 1, the shaft 16 includes a central or longitudinal axis 17, a lower end 22, an upper end 24, and a midportion 26. The jaw 14 is provided with a central bore which is threaded to receive the shaft 16. After the jaw 14 and shaft end 22 are threaded together, the jaw 14 is fixed in position by the insertion of a pair of stainless steel roll pins 18 into holes in the shaft 16. The shaft 16 is threaded with a number 8 ACME thread, which is the type of thread commonly used in small bench vises, to accommodate ready movement of the adjustable jaw along the length of the shaft 16.

Figure 6:
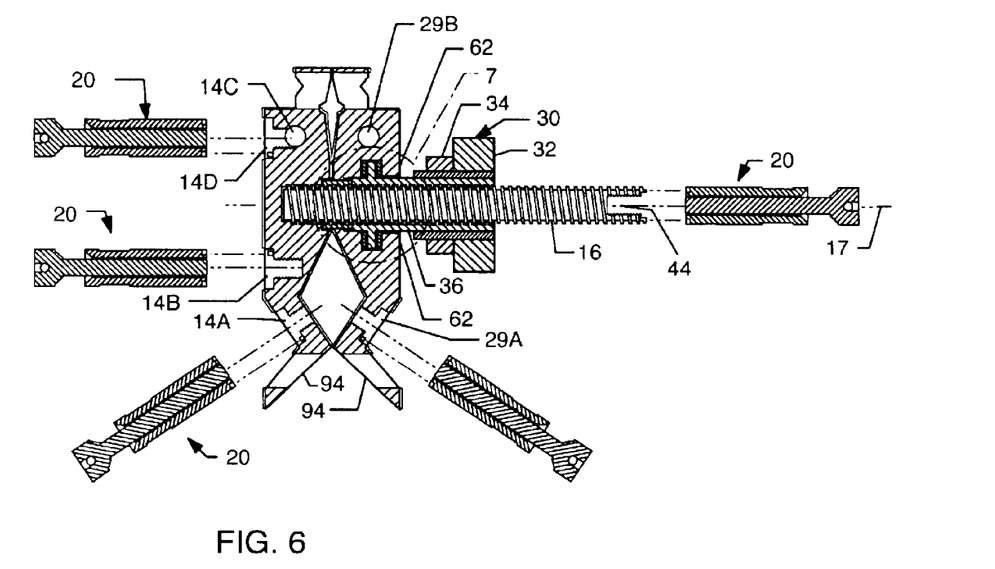
FIG. 6 is a bottom view of the adjustable jaw and adjustable knob assembly, taken along line 6—6 of FIG. 1, shown with mounting pins aligned for connection.
Figure 7:
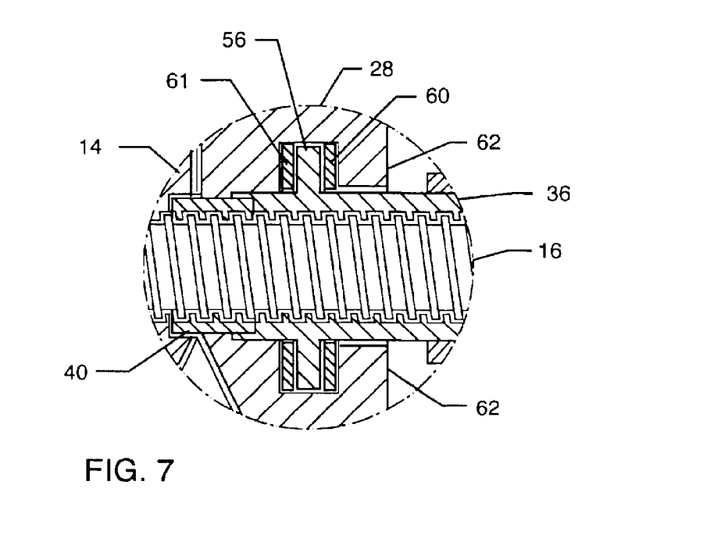
FIG. 7 is an enlarged fragmented view of the area indicated by the line 7 in FIG. 6.

The jaw 14 is provided with a total of five threaded bores or holes 14A, 14B, 14C and 14D. Hole 14C extends completely through the jaw 14 in order to accept mounting pins 20 on the opposite side (thus providing the fifth threaded hole), such the pins 20 shown in FIGS. 1–8 and 10–11 which are provided to mate with mounting receptacles that are standard on an apparatus to be supported by the clamp 10. These holes 14A–14D make it possible to insert pins in at least five separate locations on the fixed jaw 14. The holes may be vertically aligned with the central axis 17 but in different horizontal planes from the central axis 17 or each other (e.g., holes 14B, 14D as seen in FIG. 6). The holes may also be parallel to the central axis 17 though in a different horizontal plane (e.g., holes 14B, 14D as seen in FIG. 6). Additionally, the holes may be in a separate horizontal plane but perpendicular to the central axis 17 (e.g., holes 14C, 29B as seen in FIG. 6), or the holes may be at angle ranging between 0 and 60 degrees relative to the central axis 17 (e.g., 14A, 29A as seen in FIG. 6).

The adjustable jaw assembly 12 comprises a jaw 28 and an adjustment member 30. Jaw 28 is provided with a threaded bore or hole 29A for receiving a threaded mounting pin. Hole 29A which may be at an angle ranging between 0 and 60 degrees relative to the central axis 17. Hole 29B extends completely through the jaw 28 in order to accept a mounting pin 20 on both sides of the jaw (providing three mounting holes on the jaw 28).

The adjustment member 30 comprises a knob 32, a hexagonal nut 34 and a hollow, partially threaded sleeve 36. Sleeve 36 may be made of brass. The knob 32 and hexagonal nut 34 are fixed in position on the outside of the sleeve 36 to rotate the sleeve in locating the jaw 28 along the shaft 16. The hexagonal nut 34 also serves as a spacer, providing more separation between the knob 32 and the near face of the jaw 28 so that the user can manipulate the adjustment member 30 more readily. The sleeve 36 is coupled to the jaw 28 so that as the threaded sleeve 36 is rotated to move along the shaft 16, the jaw 28 is propelled along the shaft 16, either toward or away from the fixed jaw 14, depending on whether the knob 32 of the adjustment member 30 is rotated clockwise or counterclockwise. In addition, because the hollow bore of the jaw assembly 12 permits the rotation of the handle over the existing pin, one can achieve a total jaw opening of 3½ inches.

As shown in FIGS. 1–10, the knob 32 has a central hole or bore 37 for receiving the sleeve 36 and three ears or wings 38 to facilitate rotation of the adjustment member 30. The nut or spacer 34 is provided with a plurality of flats 39 in a hexagonal configuration to permit use of a standard 8" crescent-type adjustable wrench for tightening or loosening the adjustment member with greater force than can be developed manually with the user gripping the knob 32. The knob 32 may be a ¾ inch deep knob with an ergonomically designed three-bladed handle. The nut 34 may be a hexagonal one-inch nut. The knob 32 and nut 34 may constitute a single piece and be fixedly mounted at one end of the brass sleeve 36. The hexagonal nut 34 is provided with six flats to accommodate a wrench which may be used to apply more torque than could be developed by manually turning the knob.

Figure 3:
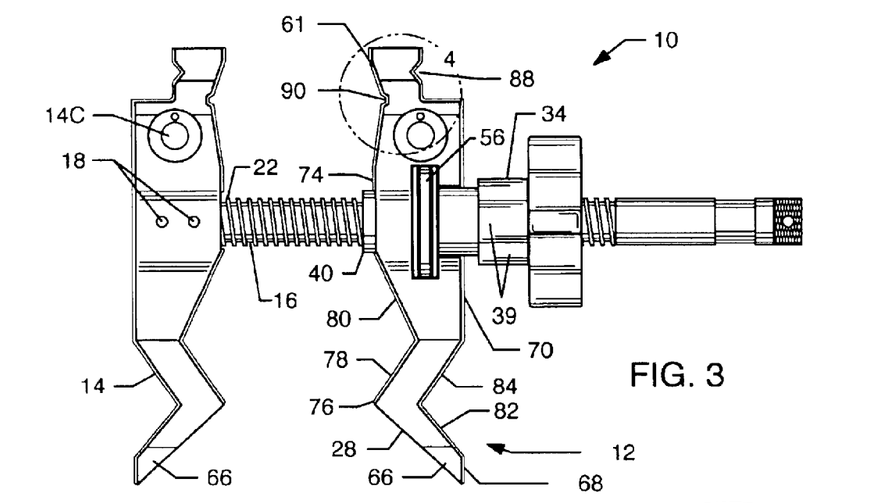
FIG. 3 is a bottom plan view of the adjustable jaw and adjusting knob assembly taken along line 3—3 of FIG. 2.
Figures 4, 5:
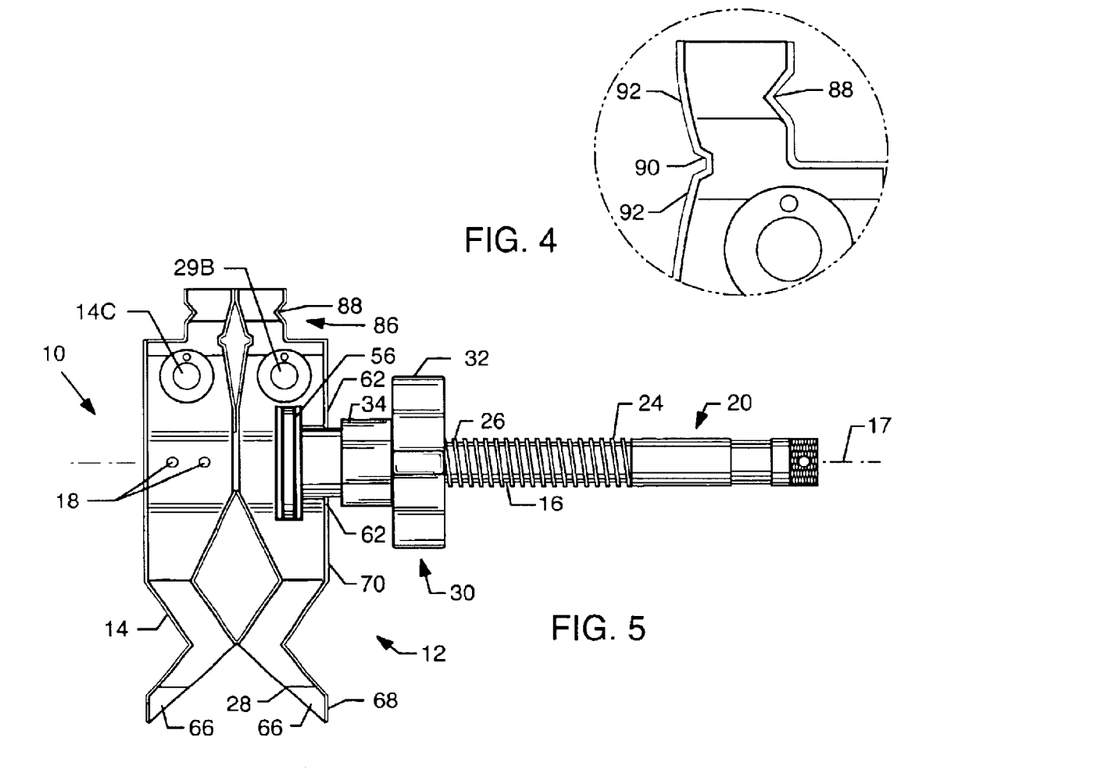
FIG. 4 is an enlarged fragmented view of the area indicated by the line 4 in FIG. 3.
FIG. 5 is a bottom view of the adjustable jaw and adjustable knob assembly taken along line 5—5 of FIG. 1.
Figure 8:
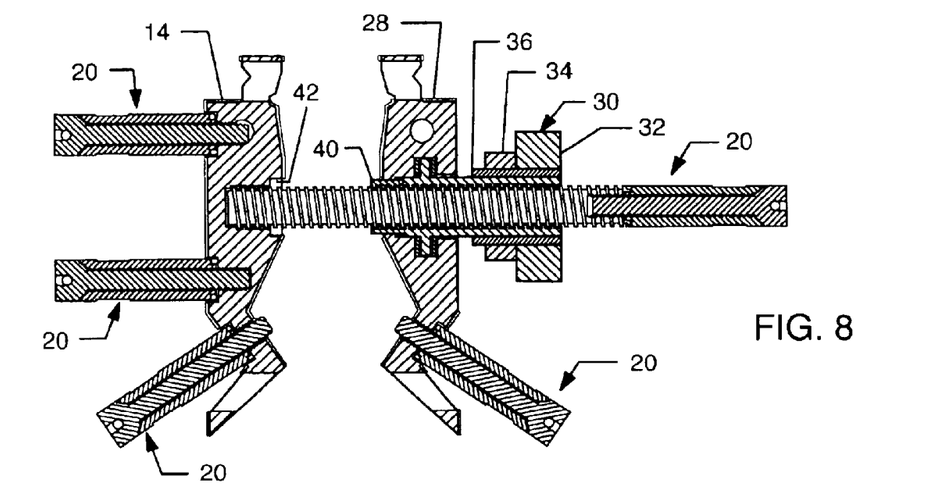
FIG. 8 is a view of the adjustable jaw and adjustable knob assembly of FIG. 6 shown with the pins connected.
Figure 9:
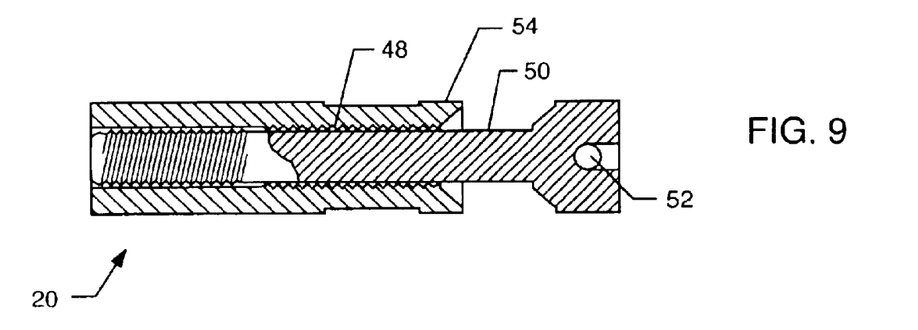
FIG. 9 is a view of a pin assembly of FIG. 1, taken along line 9—9, illustrating a pin, prior to connection to the clamp assembly.
Figure 10:
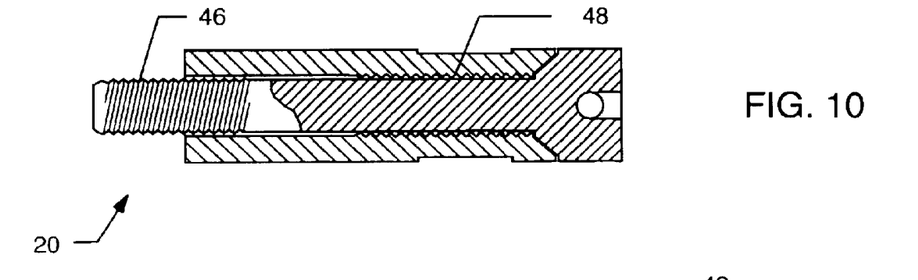
FIG. 10 is a view of the pin assembly of FIG. 2, taken along line 10—10, illustrating a pin after connection to the clamp assembly.
Figure 11:
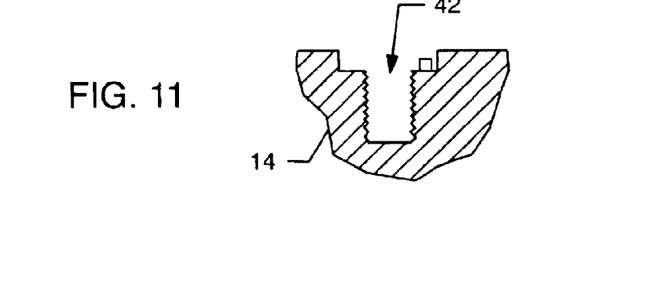
FIG. 11 is a view of the fixed jaw, taken along line 11—11 of FIG. 1, illustrating the circular recess extending about the threaded shaft to accommodate the projecting sleeve of the adjustable jaw.
Figures 12, 13:
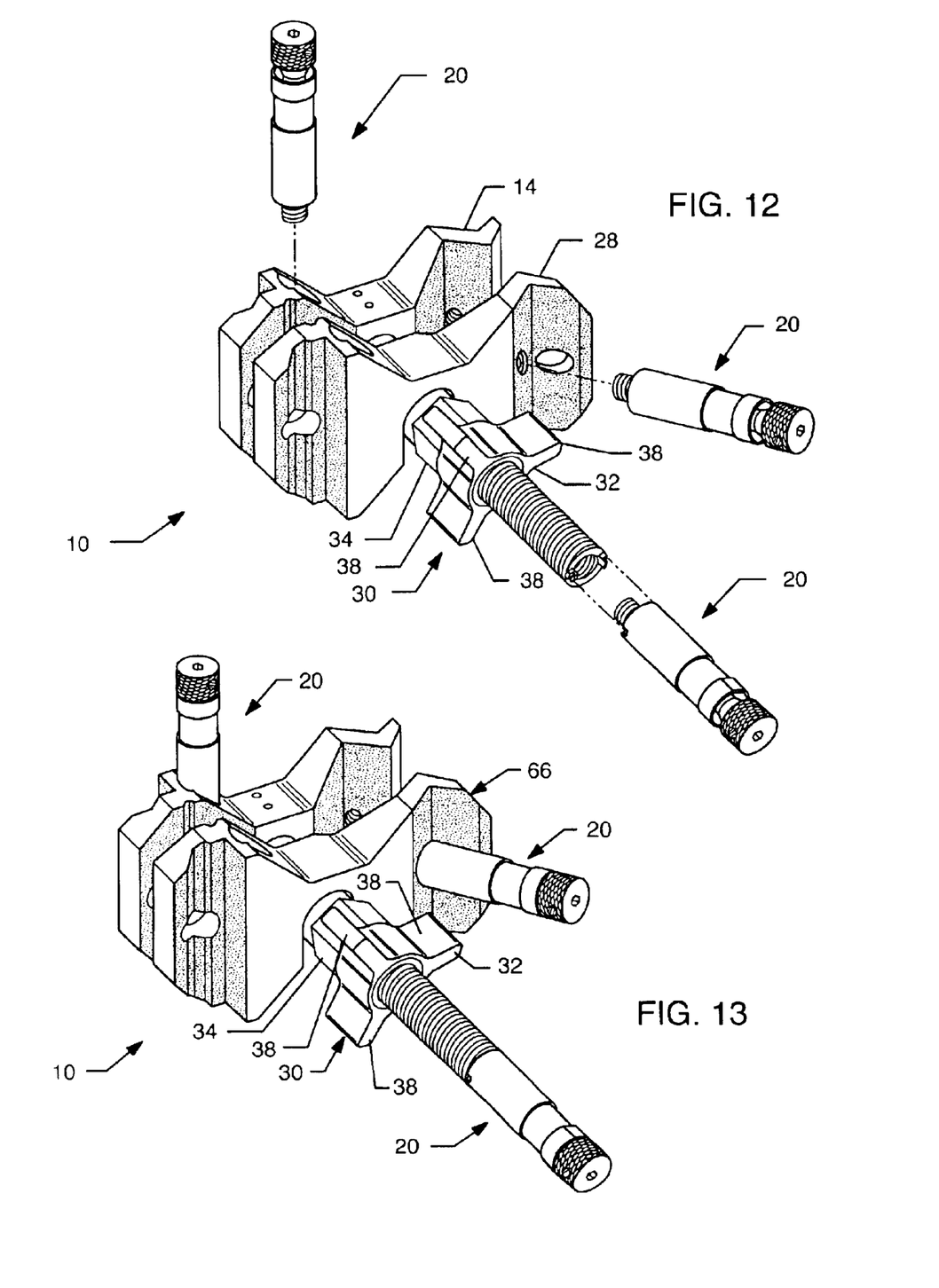
FIG. 12 is an exploded orthogonal view of the clamp assembly of FIG. 2, showing pins aligned for connection to the clamp assembly.
FIG. 13 is an orthogonal view of the clamp assembly of FIG. 12, showing pins connected to the clamp assembly.

The adjustable jaw 28 is provided with a projecting sleeve 40 which extends throughout the central opening in the jaw 28 and projects from the side of the adjustable jaw 28 facing the fixed jaw 14, as shown in FIGS. 3, 6, and 8. The projecting sleeve 40 may be made of titanium as well as other similar materials or alloys. A circular mating recess 42 is provided in the fixed jaw 14 to receive the projecting end of the titanium sleeve 40, thereby permitting the adjustable jaw 28 to be moved all the way into contact with the jaw 14 without interference by the projecting portion of the sleeve 40. The circular recess 42 extends about the shaft 16. This projecting titanium sleeve 40 protects the material of the jaw 14 from wear or binding against the threads of the shaft 16. The jaws 14, 28 may be made of aluminum, steel, titanium, or any alloy the aforementioned materials.

The upper end 24 of the shaft 16 is provided with a threaded bore 44 for receiving a threaded extension 46 of the pin 20. The threaded bore 44 in the end of the shaft 16 is of the same size as the threaded bores 14A–14D in the fixed jaw 14 and threaded bores 29A, 29B in the adjustable jaw 28 so that the same mounting pins may be used at each of the eight holes on the jaws 14, 28 as well as at the upper end 24 of the shaft 16 providing for a total of nine possible mounting points for the pin 20. The threaded extension 46 of the pin 20 is out from ⅜ inch rod, No. 16 thread. The pin 20 is provided with a threaded bore 48 which receives a section 50 of a standard ⅜ inch threaded rod in a position fixed by a stainless steel roll pin 52. The pin 20 is provided with a pair of opposed flats at its distal end 54 so as to accommodate a wrench for tightening or loosening pin 20 in end 24 of the shaft 16. The pins 20 which may be used in conjunction with the clamp assembly 10 of the present invention may be ⅝ inch diameter, which is standard in the industry. The pins 20 may be of different lengths but the threaded extension 46 of each pin 20 is ⅜ inch in diameter.

At the end of the sleeve 36, remote from the knob 32, is a radially outwardly extending, circumferential head portion 56 surrounding the sleeve 36. The circumferential head portion 56 is slid into a slot 58 in jaw 28 during assembly of the jaw assembly 12. The slot 58 may be U-shaped, extending inwardly from one side of the jaw 28 adjacent the titanium sleeve 40 to receive the partially threaded brass sleeve 36 during assembly of the adjustable jaw 28 on the shaft 16. A first face of the radially extending portion 56 is provided with a first washer 60, permanently affixed thereto. Prior to placement of the jaw assembly 12 onto the shaft 16, the extending portion 56 is slid laterally into the slot 58 of the jaw 28 a second washer 61 is slipped into position along a second face of the radially extending portion 56. Both washers 60 and 61 facilitate the spacing and lubrication of the radially extending portion 56 within the slot 58. Removal of the upper jaw 28 from the threaded shaft 16 involves performing the same process in reverse order.

In assembling the adjustable jaw 28, brass sleeve 36, and knob 32 on the shaft 16, the adjustable jaw assembly 12 is placed over the upper end 24 of the shaft 16 and the adjustment member 30 is rotated to thread the assembly 12 onto and along the shaft 16.

Turning the knob 32 in one direction causes the adjustable jaw assembly 12 to apply a force to close the jaws 14, 28. Turning the knob 32 in the opposite direction causes the adjustable jaw assembly 12 to apply a force in the opposite direction by virtue of the extended shaft portion 56 bearing against the ears 62 which extend inwardly into the opening above the slot 58. The ears 62 form a reentrant portion partially enclosing the slot 58.

As seen in FIGS. 1–8 and 12–14, the jaws 14, 28 have different sections which are variably shaped to accommodate the surfaces and shapes of various structural members on which a clamp device is supported. One of these features involves the "hourglass"-like shape of the jaws as 14, 28. It will be understood that both jaws 14, 28 are essentially identical with respect to the structural shapes now being discussed. This shape involves the indentations 64 in the sides of the jaws 14, 28. Also, the beveled edges 66 are provided at the corners of the jaw. This configuration serves to remove material at these points, thereby making the jaws lighter and also able to be inserted fore readily into certain limited access spaces for mounting the clamp.

The opposed faces of each jaw include segments of planar surfaces. Thus, for example, the jaw 28 of FIG. 1 has segments 68, 70 along its upper face in which the flat, horizontal portions fall in the same plane. Similarly, the portions 72, 74 along the lower face of the jaw 28 lie in the same plane, as does the edge 76. These planar elements are spatially distributed along the jaw so as to provide enhanced stability when the clamp is mounted against a planar surface. The intersecting planar surfaces 78, 80 of the jaw 28 (forming a v-shape), and their counterparts in the fixed jaw 14, enable the clamp to be supported on a variety of structural configurations, particularly round tubing or columns of varying diameters. The same is true with respect to the intersecting planar surfaces 82, 84 (forming a v-shape), as well as their counterparts in the fixed jaw 14, on the side of the jaw 28.

At the opposite end of the jaw 28 is an offset planar portion 86 having a V-shaped slot 88 extending transversely between the two planar portions 86. A similar slot 90 is provided along the underside of the jaw 28. These V-shaped slots 88, 90, and their counterparts in the fixed jaw 14, enable the clamp to be mounted on square stock supporting structures and prevent rotation of the stock in the clamp once the clamp is secured in either the clamping or spread mode. Curved portions 92 on opposite sides of the slot 90 facilitate clamping of the device on relatively large diameter cylindrical support elements (counterpart curved portions are also found in the fixed jaw 14 on opposite sides of the fixed jaw 14 counterpart to slot 90).

In addition, the adjustable jaw 28 and fixed jaw 14 can be rotated 180° so that the flat end of one jaw is affixed to a square stock while the round end of the other jaw is affixed to a round stock. For example, this configuration works best when the invention is used to clamp onto a "D"-shaped object.

In addition to the apertures 14A–14D, 29, each of the jaws is provided at each end with an opening or hole 94 for the attachment of a tether element, such as a carabiner or the like. If the attaching member does not include such an element at the end of the thether, for clipping into the opening 94, a line, such as a cable, cord, rope or the like, can be fed through the opening and tied to the jaw.

Figures 14, 15, 16:
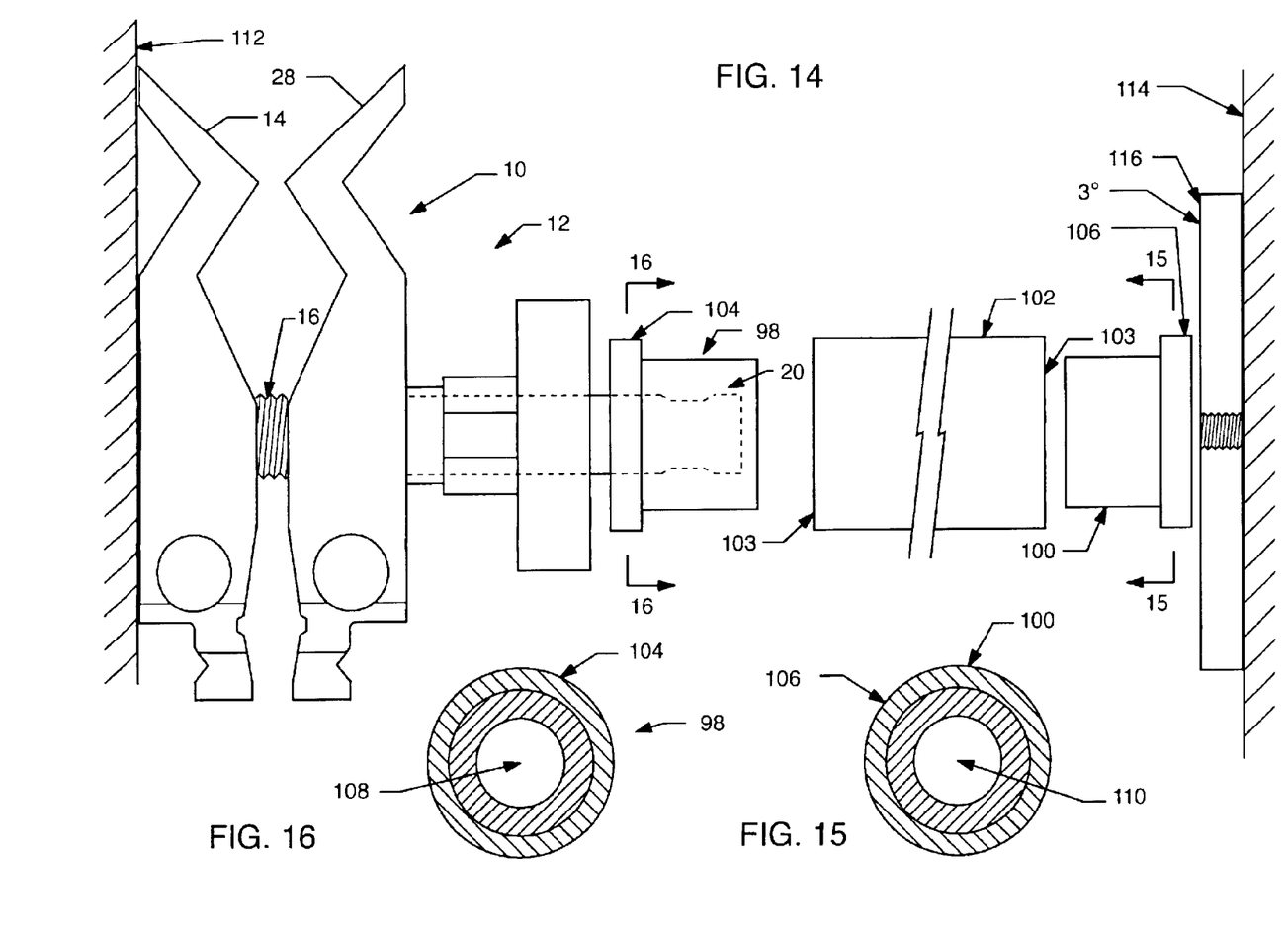
FIG. 14 is a top plan view, showing a clamp assembly, in accordance with another embodiment of the invention, being used as a wall spreader.
FIG. 15 is a cross-sectional view of an adapter element.
FIG. 16 is a cross-sectional view of another adapter element.

FIGS. 14–16, illustrate a particular kind of adapter arrangement which extends the versatility of the clamping device of the invention in wall spreader mode. The adapter portion 96 comprise adapter elements 98, 100 (which may be identical) at opposite ends of a hollow cylindrical pipe 102. The adapters 98, 100 are configured so that they may be inserted into the pipe 102 at opposite ends of the pipe 102. The respective end portions 104, 106 of the adapters 98, 100 are of greater diameter than the portion of the adapter inserted within the hollow center of the pipe 102. The outer diameter of the end portions of the adapters 98, 100 is less than the inner diameter of the hollow pipe 102 so that the adapters 98, 100 partially fit within the pipe 102. The outer diameter of the respective end portions 104, 106 of the adapters 98, 100 need only be sufficiently greater than the inner diameter of the pipe 102 so that the end portions 104, 106 bear against their respective ends walls 103 of the pipe 102 so as to provide a compressive type of support. Each of the adapters 98, 100 has a central opening 108 or 110 of a dimension to accommodate a pin 20 of an adjacent clamping device 10.

The way in which these various components are assembled in use is illustrated in FIG. 14 where the combination is represented as being mounted between the opposite sides of a doorframe, for example. The sides of the frame are designated by the numerals 112, 114. The pipe 102 with adapters 98, 100 is shown between a clamp device 10 and an angled foot 116 at opposite ends. The angled foot 116 may be at any relatively flat angle. In FIG. 14, the angled foot 116 is illustrated as approximately 3 degrees. In the alternative, the surface of an adapter contacting the angled surface of the angled foot 116 may itself be angled to match the angle of the foot 116. For example, if the angled surface of the foot is 3 degrees, the angled surface of the adapter would be −3 degrees. The clamp 10 and the angled foot 116 bear against the door frame surfaces 112, 114 at opposite ends by turning the knob 30 counterclockwise, thus driving the adjustable jaw 28 away from the fixed jaw 14, creating force against the frames 112, 114. The surface of the adapter 100 in contact with the angled foot 116 could be covered with a non-slip coating to prevent slipping along the adapter/foot interface.

The selected metal components of the invention make it possible to employ the invention under fresh or saltwater. The clamp device is designed so that no aluminum touches any stainless steel parts. Instead, the stainless steel parts are only in contact with brass or titanium parts. This metallurgical design also avoids bonding of the components b the electrolytic process.

It will be appreciated that the clamping device of the present invention adds a novel and enhanced versatility to devices in the field of the invention, providing a clamp device which has a variety of uses. The clamp has an adjusting knob which couples to the adjustable jaw in a structural configuration which applies force to the adjustable jaw to drive it in either direction along the threaded shaft. This precludes the jaw jamming in a clamped position. Mounting pins for mounting the objects on a movie set are provided as separate items which are readily threadably attachable at numerous points on the jaws and at the free end of the shaft. Since these are separate items and since the threaded shaft is cut from threaded stock rod, the cost and difficulty of fabricating an integral pin and shaft are avoided.

The above-described embodiments of the present invention are illustrative only and not limiting. It will thus be apparent to those skilled in the art that various changes and modifications may be made without departing from this invention in its broader aspects. Therefore, the appended claims encompass all such changes and modifications as falling within the true spirit and scope of this invention.

What is claimed is:

1. A clamping device for supporting lighting and rigging equipment, comprising:
    a shaft threaded along at least a portion of its length;
    a first jaw fixed to a first end of the shaft and including at least one v-shaped portion and a plurality of holes for receiving mounting pins;
    a second jaw movable along the shaft and including at least one v-shaped portion configured to oppose the v-shaped portion of the first jaw, and a plurality of holes for receiving mounting pins; and
    an adjustment member connected to the second jaw and engaging the shaft for adjustably positioning the second jaw relative to the first jaw;
    wherein the second jaw includes a projecting sleeve extending about the shaft, and the first jaw includes a circular recess extending about the shaft to accommodate the projecting sleeve such that the two jaws can be closed together without interference by the sleeve.

2. The clamping device of claim 1, wherein the adjustment member is internally threaded for mating reception of the threaded portion of the shaft.

3. The clamping device of claim 1, including a non-skid material applied on each jaw.

4. The clamping device of claim 1, wherein each jaw includes an opening for attachment of a line.

5. The clamping device of claim 1, wherein each of the mounting pin receiving holes is threaded.

6. The clamping device of claim 1, wherein the entire shaft is threaded.

7. The clamping device of claim 1, including a threaded hole extending longitudinally into a second end of the shaft.

8. The clamping device of claim 1, wherein the jaws each include a plurality of opposed v-shaped portions.

9. The clamping device of claim 1, wherein the adjustment member includes a knob and an internally threaded cylindrical sleeve slidably movable along the threaded portion of the shaft, the knob being fixed to the sleeve passes through a central hole in the knob and an outer circumference of the sleeve is fixed to the circumference of the hole.

10. The clamping device of claim 1, wherein at least one of the mounting pin receiving holes has a longitudinal axis positioned at an acute angle to a longitudinal axis of the shaft.

11. The clamping device of claim 10, wherein at least one of the mounting pin receiving holes has a longitudinal axis parallel to the longitudinal axis of the shaft.

12. The clamping device of claim 10, wherein at least one of the mounting pin receiving holes has a longitudinal axis perpendicular to a longitudinal axis of the shaft.

13. A clamping device for supporting lighting and rigging equipment, comprising:
    a shaft threaded substantially its entire length;
    a first jaw fixed to a first end of the shaft and including at least one v-shaped portion and a plurality of threaded holes for receiving mounting pins;
    a second jaw movable along the shaft and including at least one v-shaped portion configured to oppose the v-shaped portion of the first jaw, and a plurality of threaded holes for receiving mounting pins; and
    an internally threaded adjustment member connected to the second jaw and engaging the shaft for adjustably positioning the second jaw relative to the first jaw;
    wherein the second jaw includes a projecting sleeve extending about the shaft, and the first jaw includes a circular recess extending about the shaft to accommodate the projecting sleeve such that the two jaws can be closed together without interference by the sleeve.

14. The clamping device of claim 13, including a non-skid material applied on each jaw.

15. The clamping device of claim 13, wherein each jaw includes an opening for attachment of a line.

16. The clamping device of claim 13, including a threaded hole extending longitudinally into a second end of the shaft.

17. The clamping device of claim 13, wherein the adjustment member includes a knob and an internally threaded cylindrical sleeve slidably movable along the threaded shaft, the knob being fixed to the sleeve such that the sleeve passes through a central hole in the knob and an outer circumference of the sleeve is fixed to the circumference of the hole.

18. The clamping device of claim 13, wherein at least one of the mounting pin receiving holes has a longitudinal axis positioned at an acute angle to a longitudinal axis of the shaft, wherein at least one other of the mounting pin receiving holes has a longitudinal axis parallel to the longitudinal axis of the shaft, and wherein at least one other of the mounting pin receiving holes has a longitudinal axis perpendicular to the longitudinal axis of the shaft.

19. A clamping device for supporting lighting and rigging equipment, comprising:
   a threaded shaft including a first end, a second end, and a threaded hole extending longitudinally into said second end for receiving a threaded mounting pin;
   a first jaw fixed to a first end of the shaft and including at least three v-shaped portions, a plurality of threaded holes for receiving mounting pins, and an opening for attachment of a line;
   a second jaw movable along the shaft and including at least three v-shaped portions configured to oppose the v-shaped portions of the first jaw, a plurality of threaded holes for receiving mounting pins, and an opening for attachment of a line; and
   an internally threaded adjustment member connected to the second jaw and threadedly engaging the shaft for adjustably positioning the second jaw relative to the first jaw, wherein said adjustment member includes a knob and an internally threaded cylindrical sleeve slidably movable along the threaded shaft wherein the knob is fixedly mounted to said sleeve such that the sleeve passes through a central hole in the knob and an outer circumference of the sleeve is fixed to the circumference of the hole;
   wherein at least two of the v-shaped portions of the first jaw are oppositely opposed to at least two of the v-shaped portions of the second jaw, and wherein the second jaw includes a projecting sleeve extending about the shaft, and the first jaw includes a circular recess extending about the shaft to accommodate the projecting sleeve such that the two jaws can be closed together without interference by the sleeve.

20. A clamping device for supporting lighting and rigging equipment, comprising:
   a shaft threaded along at least a portion of its length;
   a first jaw fixed to a first end of the shaft and including at least one v-shaped portion and a plurality of holes for receiving mounting pins;
   a second jaw movable along the shaft and including at least one v-shaped portion configured to oppose the v-shaped portion of the first jaw, and a plurality of holes for receiving mounting pins;
   an adjustment member connected to the second jaw and engaging the shaft for adjustably positioning the second jaw relative to the first jaw; and
   a threaded hole extending longitudinally into a second end of the shaft.

21. A clamping device for supporting lighting and rigging equipment, comprising:
   a shaft threaded along at least a portion of its length;
   a first jaw fixed to a first end of the shaft and including at least one v-shaped portion and a plurality of holes for receiving mounting pins;
   a second jaw movable along the shaft and including at least one v-shaped portion configured to oppose the v-shaped portion of the first jaw, and a plurality of holes for receiving mounting pins; and
   an adjustment member connected to the second jaw and engaging the shaft for adjustably positioning the second jaw relative to the first jaw;
   wherein at least one of the mounting pin receiving holes has a longitudinal axis positioned at an acute angle to a longitudinal axis of the shaft.

22. The clamping device of claim 21, wherein at least one of the mounting pin receiving holes has a longitudinal axis parallel to the longitudinal axis of the shaft.

23. The clamping device of claim 21, wherein at least one of the mounting pin receiving holes has a longitudinal axis perpendicular to a longitudinal axis of the shaft.

* * * * *